UNITED STATES PATENT OFFICE.

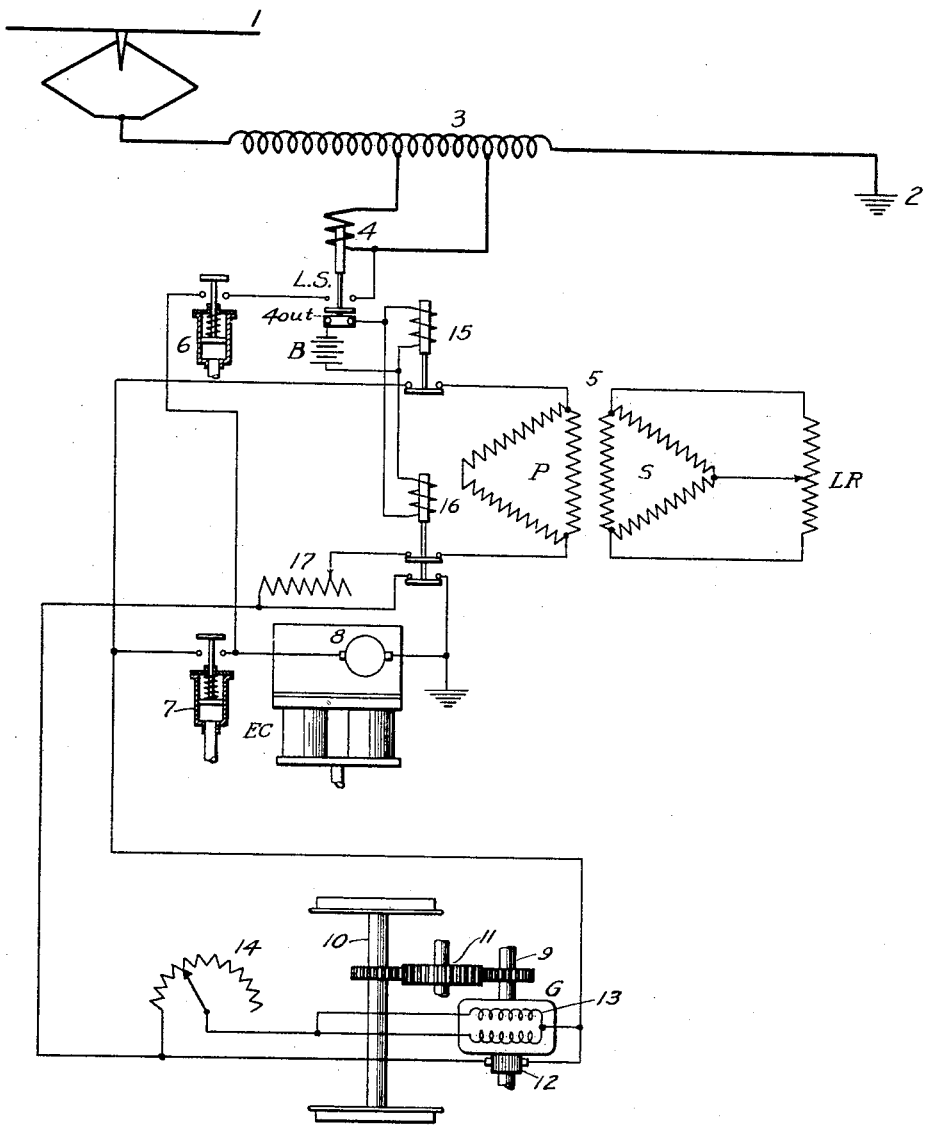

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,376,466.  Specification of Letters Patent.  Patented May 3, 1921.

Application filed June 15, 1917. Serial No. 174,902.

*To all whom it may concern:*

Be it known that I, KARL A. SIMMON, a citizen of the United States, and a resident of Edgewood Park, in the county of Allegheny and State of Pennsylvania, have invented a new and useful Improvement in Systems of Control, of which the following is a specification, this application being a continuation in part of application Serial No. 876,441, filed December 10, 1914.

My invention relates to systems of control for electric motors and particularly to means for effecting emergency braking of electric vehicles upon a failure of the supply-circuit voltage or a similar contingency.

One object of my invention is to provide means of the above-indicated character for insuring both dynamic-braking and continued air braking under emergency conditions.

Another object of my invention is to provide a novel arrangement of control apparatus and an air compressor whereby, upon a failure of supply-circuit voltage, the momentum-driven vehicle may be automatically retarded by means of dynamic or continued air braking or both.

Another object of my invention is to provide an air compressor that is normally driven from the supply circuit but is adapted to be connected to an auxiliary generator upon a failure of supply-circuit energy and thus maintain the vehicle at a safe speed when descending a grade.

More specifically, my invention embodies a control system for an electric vehicle having an air compressor that is normally operated from the supply circuit to effect air braking, and an axle-driven generator which is adapted to operate the air compressor under predetermined conditions and which is associated with the vehicle-propelling motor for effecting dynamic-braking.

In a pending application, Serial No. 876,441, filed Dec. 10, 1914, by myself, and of which this application is a continuation in part, is disclosed a system having two air compressors, one of which is operated from the supply circuit and the other of which is axle driven.

The single figure in the accompanying drawing is a diagrammatic view of a system embodying my invention.

Referring to the drawing, a system for an electric vehicle is shown comprising a supply circuit embodying a trolley conductor 1 and a ground-return conductor 2. A transformer winding 3, which is connected across the supply conductors 1 and 2, is adapted to energize a switch 4 for a purpose to be described later. A polyphase induction motor 5, having a primary winding P and a secondary winding S, with which a speed-controlling resistor or liquid rheostat LR is preferably associated, is provided for propelling the vehicle. An air compressor EC is provided for supplying air to the air-brake system, and two governors 6 and 7 are provided for respectively connecting a motor 8 of the air compressor EC to various sources of energy, as will be described later.

An auxiliary generator G, which is mounted on a jack-shaft 9, may be connected to an axle 10 in any approved manner, as by means of the gear wheels 11. The generator G is provided with an armature 12 which is mounted on the jack-shaft 9 and with a suitable shunt-field winding 13 which may be varied by means of a resistor 14.

Two switches 15 and 16 are provided for connecting the primary winding P of the induction motor 5 to the generator G in order to effect dynamic-braking of the vehicle whenever there is a failure of line-circuit voltage and the switch 4 is released. The coils of the switches 15 and 16 are energized by a circuit including the battery B that is completed by means of an interlock switch 4-out. A variable resistor 17 is inserted in the circuit connecting the generator G and the primary winding P of the propelling motor for varying the rate of dynamic-braking, as hereinafter set forth. The switch 16 not only completes the circuit from the generator G to the primary winding P of the induction motor but also prepares a circuit between the air compressor 8 and the generator G which may be completed by the regulator 7.

The two governors 6 and 7 are respectively adapted to connect the motor 8 of the air compressor EC to the supply circuit embodying the conductors 1 and 2 and to the generator G. Preferably, the governor 7 is adjusted to connect the motor 8 to the generator G at a pressure approximately 10% lower than the pressure at which the governor 6 is adapted to operate, thereby insuring that the air compressor will be energized to its fullest extent from the generator G in supplying pressure to the air-braking system whenever the governor 7 is inoperative due to failure of voltage in the supply circuit. The switch 4 is provided with means for preventing the connecting of the motor 8 through the governor 6 to the supply conductors 1 and 2 when there is a failure of supply-circuit voltage.

Inasmuch as the control system for effecting the normal propelling operation of the induction motor may be of any well known suitable type and, moreover, is not essential to the operation of my invention, I have not deemed it necessary to show or describe any particular type of accelerating system. It will be understood that the singlephase energy absorbed from the transformer winding 3 may be converted into polyphase energy for supplying the propelling induction motor by means of a suitable phase converter, and that the secondary winding resistor LR may be employed in effecting acceleration in accordance with the usual practice.

Assuming the parts of the system to occupy the respective positions shown, the emergency-braking operation thereof may be set forth as follows: upon a failure of supply-circuit energy, the coil of the switch 4 is deënergized and the interlock switch 4-out is operated to complete a circuit from the battery B for energizing the coils of the switches 15 and 16. The switches 15 and 16 are closed to connect the primary winding P of the propelling motor 5 through the variable resistor 17 across the armature 12 of the auxiliary generator G. The propelling motor 5 is thereupon converted into a braking generator, the energy of the vehicle, as its speed decreases, being absorbed electrically by the resistor LR that is associated with the secondary winding S of the propelling motor, the rate of rotation being varied by manipulating the resistor 17. If desired, a suitable pressure may be maintained in the air-brake system for effecting air braking of the vehicle during the dynamic-braking thereof. The motor 8 of the air compressor EC, as before set forth, may be connected across the armature 12 of the generator G by means of the switch 16 and the governor 7.

It will be observed that the system set forth provides means for either dynamic or continued air braking, or both, of a momentum-driven vehicle under emergency conditions, whereby the vehicle may be readily brought to rest or maintained at a suitable speed when descending a grade.

Modifications in the system and arrangement and location of parts may be made within the spirit and scope of my invention and such modifications are intended to be covered by the appended claims.

I claim as my invention:

1. In a system of control, the combination with a supply circuit, an electric vehicle-propelling motor, and a motor-driven air compressor operated from the supply circuit, of an auxiliary generating dynamo-electric machine driven from the vehicle wheels, and means dependent upon a predetermined variation in the supply-circuit voltage for connecting said machine to energize said motor to effect dynamic-braking of the vehicle and for operating said air compressor.

2. In a control system for an electric vehicle, the combination with a supply circuit, a propelling motor adapted to be connected to the supply circuit, and an air-brake system having an air compressor associated therewith, of an axle driven generator and means for selectively operating the air compressor from the supply circuit and the axle-driven generator.

3. In a control system for an electric vehicle, the combination with a supply circuit, a propelling motor adapted to be connected to the supply circuit, and an air-brake system having an air compressor associated therewith, of an axle-driven generator associated with said motor for effecting dynamic-braking, and means for selectively operating the air compressor from the supply circuit and the axle-driven generator.

4. In an electric vehicle, a propelling induction motor and a motor-driven air compressor, and means comprising a generator operated by the momentum of the vehicle for operating said air compressor and for effecting dynamic-braking of the vehicle.

In testimony whereof I have hereunto subscribed my name this 31st day of May, 1917.

KARL A. SIMMON.